United States Patent
Maeno et al.

(10) Patent No.: US 6,824,486 B2
(45) Date of Patent: Nov. 30, 2004

(54) GEAR PUMP FOR AUTOMATIC TRANSMISSION

(75) Inventors: Katsuhiro Maeno, Anjo (JP); Akira Matsuo, Anjo (JP); Yoshinori Shibayama, Anjo (JP); Osamu Takeuchi, Anjo (JP); Kazutoshio Nozaki, Toyota (JP); Toshiki Kanada, Toyota (JP)

(73) Assignees: Aisin Aw Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/272,306

(22) Filed: Oct. 17, 2002

(65) Prior Publication Data

US 2003/0087718 A1 May 8, 2003

(30) Foreign Application Priority Data

Oct. 18, 2001  (JP) ........................................ 2001-320905

(51) Int. Cl.$^7$ .............................................. F01C 21/04

(52) U.S. Cl. ........................ 475/136; 418/77; 418/166

(58) Field of Search ................................ 418/166, 171, 418/77; 475/136

(56) References Cited

U.S. PATENT DOCUMENTS

| | | | | |
|---|---|---|---|---|
| 3,547,565 A | * | 12/1970 | Eddy | 418/61.3 |
| 3,824,047 A | * | 7/1974 | McDermott | 418/171 |
| 3,834,842 A | * | 9/1974 | Dorff et al. | 418/171 |
| 4,235,217 A | * | 11/1980 | Cox | 418/171 |
| 4,361,419 A | * | 11/1982 | Vohringer | 418/171 |
| 4,699,577 A | * | 10/1987 | Dlugokecki et al. | 418/77 |
| 4,905,535 A | * | 3/1990 | Ludwig et al. | 418/77 |
| 4,968,233 A | * | 11/1990 | Nakayoshi et al. | 418/77 |
| 5,554,019 A | * | 9/1996 | Hodge | 418/171 |

FOREIGN PATENT DOCUMENTS

| | | | | |
|---|---|---|---|---|
| JP | 05164060 | * | 6/1993 | F04C/2/10 |
| JP | 11082644 | * | 3/1999 | F16H/3/62 |

* cited by examiner

*Primary Examiner*—Charles A Marmor
*Assistant Examiner*—Eric M. Williams
(74) *Attorney, Agent, or Firm*—Lorusso, Loud & Kelly

(57) ABSTRACT

An oil film is formed between side faces of a pump gear and side faces of a pump casing to thereby reduce wear and reduce sliding resistance. To form the oil film predetermined numbers of recesses are provided in both side faces of a drive gear and in both side faces of a driven gear of the gear pump. The recesses serve to hold oil. The oil held in the recesses oozes out to between the opposing and contacting side faces to thereby form the oil films therebetween.

9 Claims, 6 Drawing Sheets

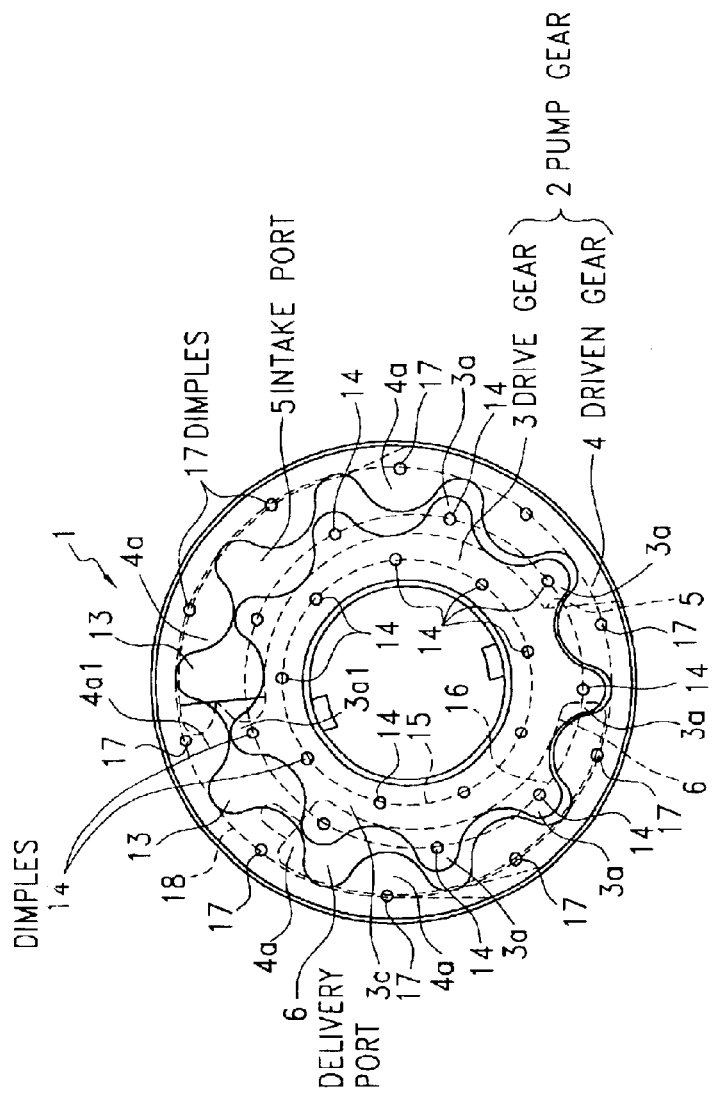
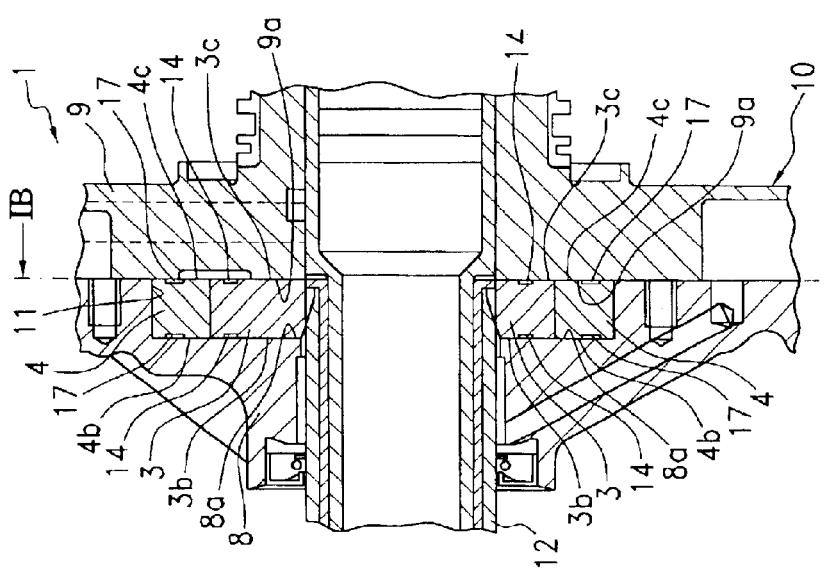
FIG.1(b)
FIG.1(a)

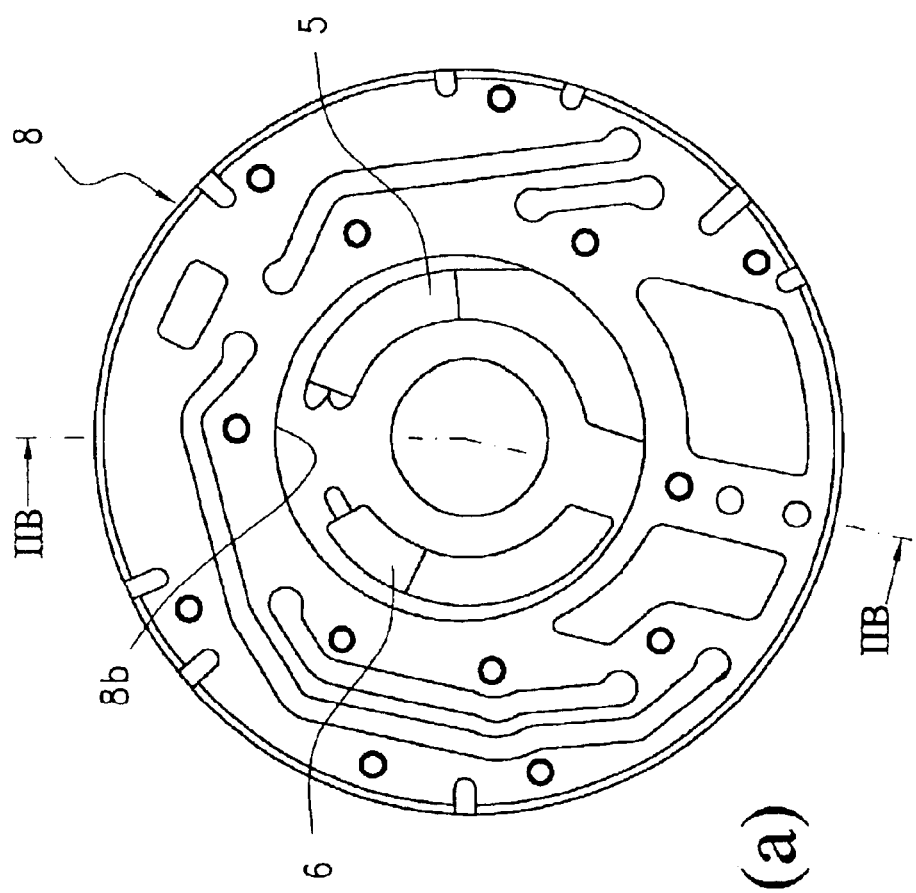
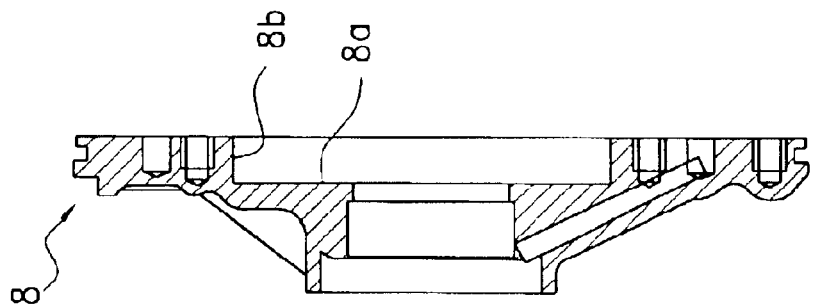
FIG.2(a)
FIG.2(b)

GEAR PUMP FOR AUTOMATIC TRANSMISSION

BACKGROUND OF THE INVENTION

1. Field of the Invention

The field of the present invention is gear pumps used in various hydraulic machines, for example an automatic transmission of an automobile, for generating a hydraulic pressure.

2. Description of the Related Art

Conventionally, automatic transmissions have a planetary gear unit with a plurality of rotating elements and a plurality of frictional engagement elements, i.e., clutches and brakes, for respectively engaging and releasing the rotating elements. Automatic transmission control is provided by controlling rotation of the plurality of rotating elements of the planetary gear unit by selective engagement and disengagement of the frictional engagement elements.

Engagement and disengagement of the frictional engagement elements is controlled by hydraulic pressure which, in turn, is controlled in accordance with vehicle speed or an operating condition by a hydraulic control unit of the automatic transmission. The hydraulic pressure supplied to the hydraulic control unit is produced by an oil pump as described in, for example, JP-A-11-82644.

As disclosed in JP-A-11-82644, the oil pump is a gear pump which generates the hydraulic pressure by a pump gear driven by the engine of the vehicle. The gear pump supplies the hydraulic pressure to the hydraulic control unit as mentioned above, to the torque converter of the automatic transmission and to lubricating portions of the automatic transmission.

As shown in FIGS. 5(a) and 5(b), a gear pump 1 is an internal tooth gear pump in which the pump gearing 2 includes a pair of drive gears 3 having a predetermined number of outer teeth 3a and a driven gear 4 having a predetermined number of inner teeth 4a. The drive gears 3 and the driven gear 4 are arranged eccentric to each other in a gear chamber 11 formed in a casing 10. The casing 10 includes a pump body (O/P body) 8 and a pump cover (O/P cover) 9. Portions of the outer teeth 3a and the inner teeth 4a mesh with each other at a boundary portion 7 of an intake port 5 and a delivery port 6. The tip of an outer tooth $3a_1$ and tip of an inner tooth $4a_1$ on a side substantially opposed to the intermeshed teeth, relative to the rotational center, are brought into contact with each other.

Further, by rotating the drive gears 3 via shaft 12 driven by the engine, not illustrated, and also rotating the driven gear 4 in the same direction by rotation of the drive gears 3, the outer tooth 3a and the inner tooth 4a which are brought into contact with each other, are successively changed. Further, by gradually increasing volume of a pump chamber 13 formed between an outer periphery of the drive gears 3 and an inner periphery of the driven gear 4 and communicating with the intake port 5, an operating fluid is drawn in through the intake port 5, the pump chamber 13 is cut off from the intake port 5 and communicates with the delivery port 6 and by gradually reducing the volume of the pump chamber 13 thereafter, the operating fluid is discharged from the pump chamber 13 through the delivery port 6.

In the conventional gear pump 1, as shown in FIG. 5(a), the total area of both side faces 3b and 3c of the drive gear 3 and both side faces 4b and 4c of the driven gear 4, contact and slide on a gear chamber side face 8a of the pump body 8 and a gear chamber side face 9a of the pump cover 9. Therefore, it is difficult to form oil films between the side faces 3b and 3c of the drive gear 3 and the side faces 4b and 4c of the driven gear 4 and the gear chamber side face 8a of the pump body 8 and the gear chamber side face 9a of the pump cover 9.

When the side faces 3b and 3c, 4b and 4c of the respective gears 3 and 4 and the gear chamber side faces 8a and 9a are brought into direct contact with each other in this way, wear is produced at the respective areas of contact and the delivery capacity of the gear pump 1 is thereby gradually reduced by that wear. Further, the sliding resistance also causes loss of torque in the gear pump 1.

Further, with an automatic transmission using the conventional gear pump 1, the driving force of the engine must be increased by the amount of loss of torque and therefore causes fuel consumption to increase.

SUMMARY OF THE INVENTION

Accordingly, an object of the present invention is to provide a gear pump facilitating formation of an oil film between side faces of a pump gear and a side face of a pump casing to thereby reduce wear at the respective areas of sliding contact and to thereby prevent a reduction in delivery and reduce loss of torque by reduction of sliding resistance.

It is another object of the present invention to provide an automatic transmission reducing the force required of a drive source to thereby reduce fuel consumption.

In a first aspect, the present invention provides a gear pump including a casing having an intake port, a gear chamber and a delivery port, and pump gearing including a pair of gears arranged in the gear chamber and in mesh with each other, whereby oil is taken in through the intake port and delivered from the delivery port. A recess is formed at at least one side face selected from the side faces of the gears and the side faces of the gear chamber of the casing on which the side faces of the gears slide.

According to a second aspect of the invention, one gear of the pair of gears is a drive gear having outer teeth and other gear of the pair of gears is a driven gear eccentric to the one gear and having inner teeth in mesh with the outer teeth.

According to a third aspect of the invention, when the recesses are formed in at least one side face of the drive gear and the side faces of the gear chamber of the casing on which the drive gear slides, the recesses are arranged on at least one of an inner circle disposed concentric with the drive gear and on an inner side of bottoms of spaces between the outer teeth and an outer circle disposed on an outer side of the bottoms. When the recesses are formed in at least one side face selected from the side faces of the driven gear and the side faces of the gear chamber of the casing on which the side faces of the driven gear slide, the recesses are arranged on a circle concentric with the driven gear and having a diameter the same or substantially the same as the diameter of bottoms of the spaces between the inner teeth.

According to a fourth aspect of the invention, when the recesses are arranged on the inner circle they lie on a diameter line passing through a center of the bottom of a space between the teeth. When the recesses are arranged on the outer circle they are located at the peripheral (circumferential) center of one of the outer teeth, and when the recesses are arranged on the circle having the same diameter or substantially the same diameter concentric with the driven gear, they are located at the peripheral (circumferential) center of one of the inner teeth.

In a fifth aspect, the present invention provides a gear pump having a casing formed with an intake port, a gear chamber and a delivery port, and a pair of gears rotatably mounted in the gear chamber of the casing and in mesh with each other. Oil is sucked in at the intake port and discharged from the delivery port by rotation of the pair of gears while the radially extending side surfaces of the gears slide on side faces of the gear chamber of the casing. At least one of the side faces of the pair of gears and the side faces of the gear chamber of the casing on which the gear side faces slide, has means for forming an oil film between the opposed sliding surfaces.

Further, according to a sixth aspect of the present invention, the means for forming the oil film of the fifth aspect comprises recesses for holding the oil.

A seventh aspect of the present invention provides an automatic transmission comprising a planetary gear unit having a plurality of rotating elements, a plurality of frictional engagement elements including at least a clutch and a brake for selectively engaging and releasing the plurality of rotating elements, and a hydraulic control unit for supplying a controlled hydraulic pressure, produced by controlling the hydraulic pressure supplied from an oil pump, at a predetermined magnitude to the frictional engagement elements. Rotation of a drive source, e.g., an engine, is input to the automatic transmission which changes its speed by hydraulically controlling engagement and disengagement of the frictional engagement elements utilizing the hydraulic control unit. The oil pump is a gear pump according to any one of the first through fourth aspects of the invention.

In the gear pump according to the first through the fourth aspects of the invention, the recesses are formed in at least one of six side faces which include the side faces of the pair of gears and the side faces of the gear chamber of the casing on which the respective side faces of the gears slide, which recesses store oil. The oil stored in the recesses oozes out between the opposing and contacting side faces due to centrifugal force produced by rotation of the gears and due to capillary action to thereby form oil films therebetween.

With the gear pump-of the first through the sixth aspects of the invention, oil films are formed between the side faces of the gears and the side faces of the gear chamber of the casing to thereby reduce wear of the sliding faces of the pair of gears and of the gear chamber and to thereby prevent change of the delivery rate with aging of the gear pump. Further, the oil films formed between the sliding side faces reduce sliding resistance therebetween and loss of torque.

Particularly, according to the first through the fourth aspects of the invention, the recesses can be formed by a sintered mold simultaneously with molding of the gears or the casing and, therefore, working steps and cost can be made substantially equivalent to manufacture of the conventional gear pump. Further, by providing the recesses, the material of the gears and/or the casing can be saved and, therefore, the weight of the gears and/or the casing can be reduced and material cost can be saved. Thereby, cost of the gear pump is also reduced.

Further, according to the first through the fourth aspects of the invention, the recesses are provided in the pump gears and/or the casing of an otherwise conventional gear pump and, therefore, a conventional pump gear or casing can be used and an entirely new pump gear need not be formed. Therefore, considerable design change is not needed and cost can be further reduced.

Particularly according to the third aspect of the invention, by providing the drive gear with the recesses arranged on an outer circle concentric with the drive gear and the recesses arranged in the driven gear, the recesses can consecutively face the intake port and the delivery port by rotation of the drive and driven gears and, therefore, the oil can be effectively stored in the recesses facing the ports. Thereby, the oil films can be reliably formed between (1) the side faces of the drive gear(s) and/or the side faces of the driven gear and (2) the side faces of the gear chamber of the casing.

Further, according to the fifth and the sixth aspects of the invention, the means for forming the oil film includes projections, it is not necessary to provide the recesses at both the pair of gears and the casing. Particularly, according to the sixth aspect of the invention, by forming either the side faces of the pair of gears or the side faces of the gear chamber of the casing with the recesses and projections as the means for forming the oil film, working of the other of the pair of gears or the casing can be avoided.

Further, according to the automatic transmission of the seventh aspect of the invention, the gear pump is an otherwise conventional gear pump but, as mentioned above, loss of torque can be reduced and, therefore, drive force of the engine can be reduced by that amount, fuel cost can be improved and energy conservation and a reduction in emissions can be achieved. Further, since the drive force of the engine can be reduced, the engine can be made smaller and, given the additional weight reduction of the drive gears, the drivetrain of the vehicle can be made smaller in size and more compact.

BRIEF DESCRIPTION OF THE DRAWINGS

FIG. 1(a) is a partial sectional view taken along the axis; and FIG. 1(b) is a sectional view taken along line IB—IB in FIG. 1(a);

FIG. 2(a) is a front view of the pump body (O/P body) of the gear pump shown in FIGS. 1(a) and 1(b); and FIG. 2(b) is a sectional view taken along line IIB—IIB in FIG. 2(a);

DETAILED DESCRIPTION OF THE PREFERRED EMBODIMENT

Figures 5A, 5B:
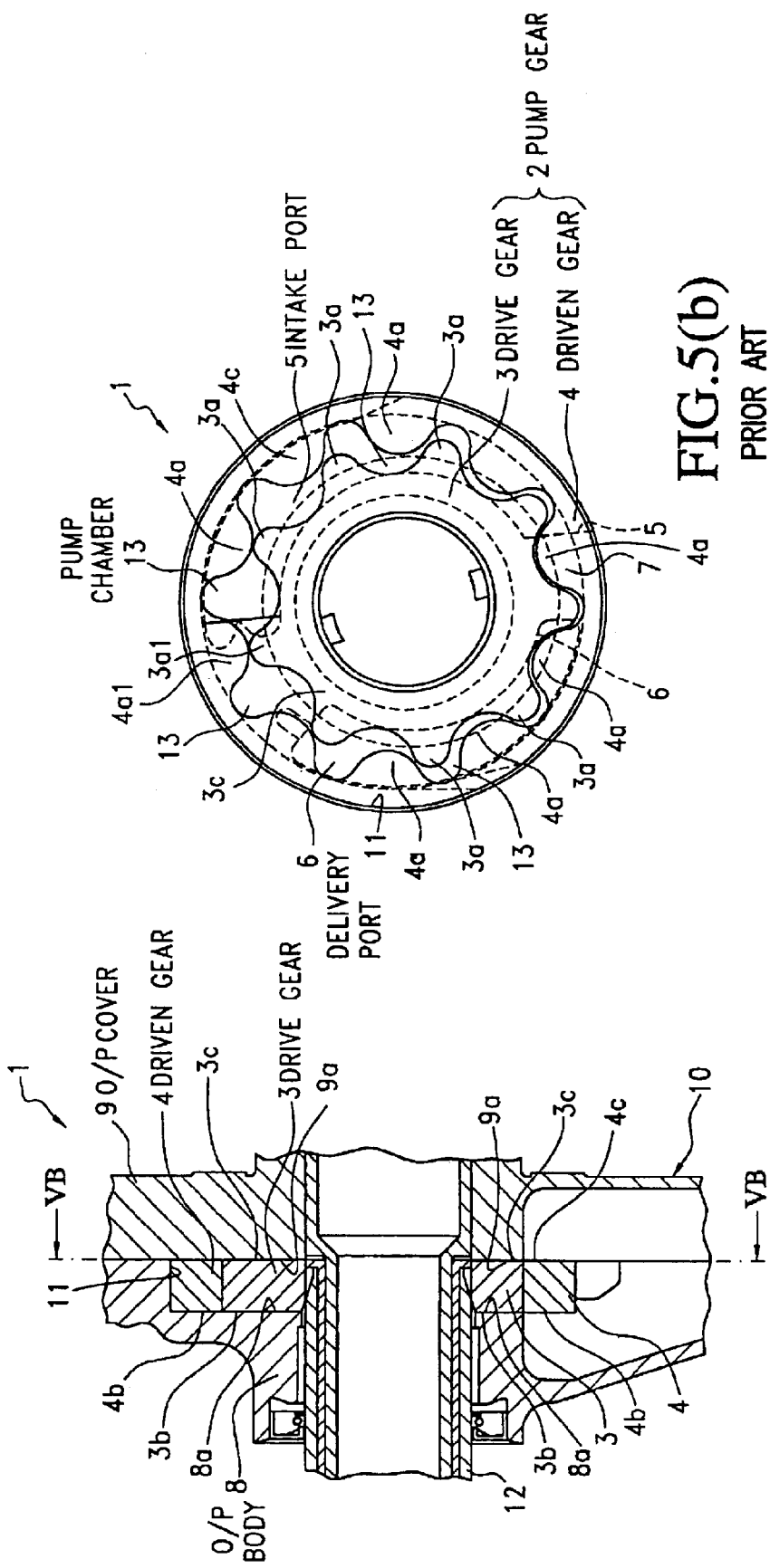
FIG. 5(a) is a partial sectional view along the axis.
FIG. 5(b) is a view taken along line VB—VB in FIG. 5(a)

Preferred embodiments of the present invention will now be described with reference to the accompanying drawings.
First Embodiment As shown by FIGS. 1(a) and 1(B), the gear pump 1 of a first preferred embodiment, similar to the conventional gear pump 1 shown in FIGS. 5(a) and 5(b), is an internal tooth gear pump including a drive gear 3 having outer teeth 3(a) and a driven gear 4 having inner teeth 4a.

Each of the radially extending side faces 3b and 3c of the drive gear 3 is formed with a first predetermined number (18 in the one side face shown in FIGS. 1(a) and 1(b)) of recesses (dimples) 14, 14, . . . , each in the shape of a circular cylinder. The recesses (dimples) 14, 14, . . . are respectively arranged on a radially inward circle 15 and a radially outward circle 16 concentric with the drive gear 3. The recesses (dimples) 14, 14, . . . arranged on the radially inward circle 15 are formed on diametric lines (not illustrated) which extend through the centers of the indents between the contiguous outer teeth 3a.

Further, the recesses (dimples) 14, 14, . . . arranged on the radially outward circle 16, are respectively formed in the outer teeth 3a at the peripheral (circumferential) centers of the outer teeth 3a. The recesses (dimples) 14, 14, . . . arranged on the radially outward circle 16 face the intake port 5 and the delivery port 6. Oil is stored in the recesses (dimples) 14, 14, . . . which are arranged on circles 15 and 16.

By providing the recesses (dimples) 14, 14, . . . in this manner, the drive gear 3 is dynamically balanced and can be stably rotated.

Further, each of the radially extending (axially facing) side faces 4b and 4c of the driven gear 4 is formed with a second predetermined number (10 in the example illustrated in FIGS. 1(a) and 1(B)) of recesses (dimples) 17, 17, . . . having the same shape and dimension as the above-described recesses (dimple) 14. The recesses (dimples) 17, 17, . . . are concentric with the driven gear 4 and are disposed at the circumferential centers of the inner teeth 4a on a circle 18 having a diameter the same as or substantially the same as the diameter of a circle defined-by the bottom portions of the inner teeth 4a. The recesses (dimples) 17, 17, . . . face the intake port 5 and the delivery port 6. Oil is also stored in the recesses (dimples) 17, 17, . . . . By providing the recesses (dimples) 17, 17, . . . in this way, the driven gear 4 is dynamically balanced and can be stably rotated.

Figure 6:
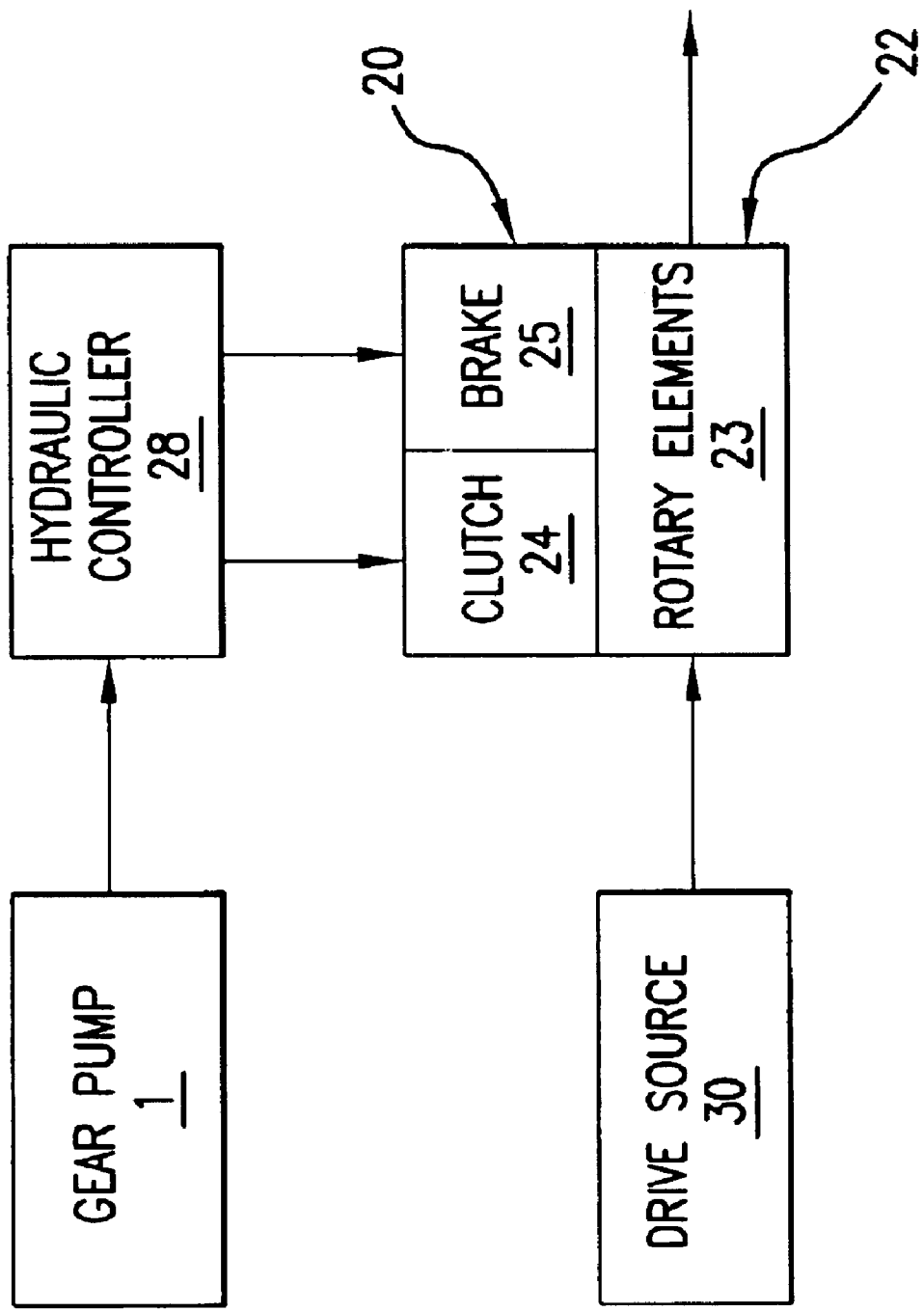
FIG. 6 is a schematic view of an automotive powertrain incorporating the gear pump of the present invention.

The size and number of the recesses (dimples) 14 and 17 are set such that both the delivery capacity of the gear pump 1 and the strengths of the gears 3 and 4 are not less than an otherwise identical gear pump without recesses (dimples) 14 and 17. For example, in the embodiment shown in FIGS. 1(a) and 1(b), the driven gear 4 is formed with 10 recesses 17 per face side (20 recesses for both faces), each having the shape of a circular cylinder, with a diameter φ of 3 mm and a depth of 0.75 mm, on both side faces of a circular plate having a diameter φ of 93 mm and a thickness of 10.8 mm and formed with inner teeth. The drive gear 3 is formed with 18 recesses 14 per face side (36 recesses on both faces), each of the recesses 14 being substantially in the shape of a circular cylinder having a diameter φ of 3 mm and a depth of 0.75 mm. Further, the automatic transmission schematically shown in FIG. 6 and partially shown in FIG. 1 (a), may be a conventional automatic transmission 20 for example as disclosed in the above-mentioned publication JP-A-11-82644. That conventional transmission includes a planetary gear unit 22 having a plurality of rotating elements 23 a plurality of frictional engagement elements, i.e., clutches 24 and brakes 3., for engaging or locking the plurality of rotating elements, and a hydraulic pressure control unit 2 for supplying a controlled hydraulic pressure, produced by control of oil pressure supplied from the oil pump 1 to predetermined frictional engagement elements for controlling their engagement and disengagement and thereby controlling transfer of torque from the engine through the automatic transmission 20. Further, it is also possible to use a stepped or stepless semiautomatic or fully automatic transmission coupled with a drive source for starting up from standstill or for speed change or for both.

As shown in FIGS. 2(a) and 2(b), the pump body (O/P body) 8 of the casing 10 is formed with a recess 8b serving as gear chamber 11. Intake port 5 is provided such that a portion thereof is disposed radially inward of the recess 8b and the delivery port 6 is provided such that a portion thereof is similarly disposed inside of the recess 8b.

Figure 3B:
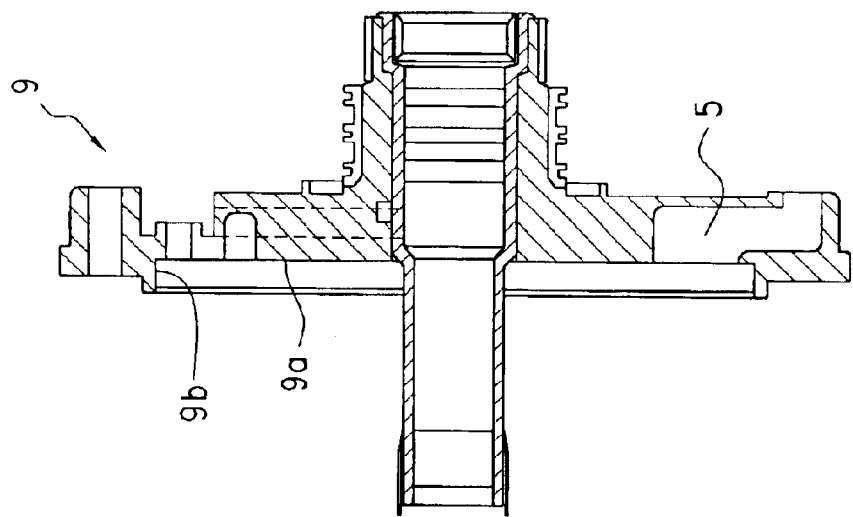
FIG. 3(b) is a sectional view taken along line IIIB—IIIB in FIG. 3(a)
Figure 3A:
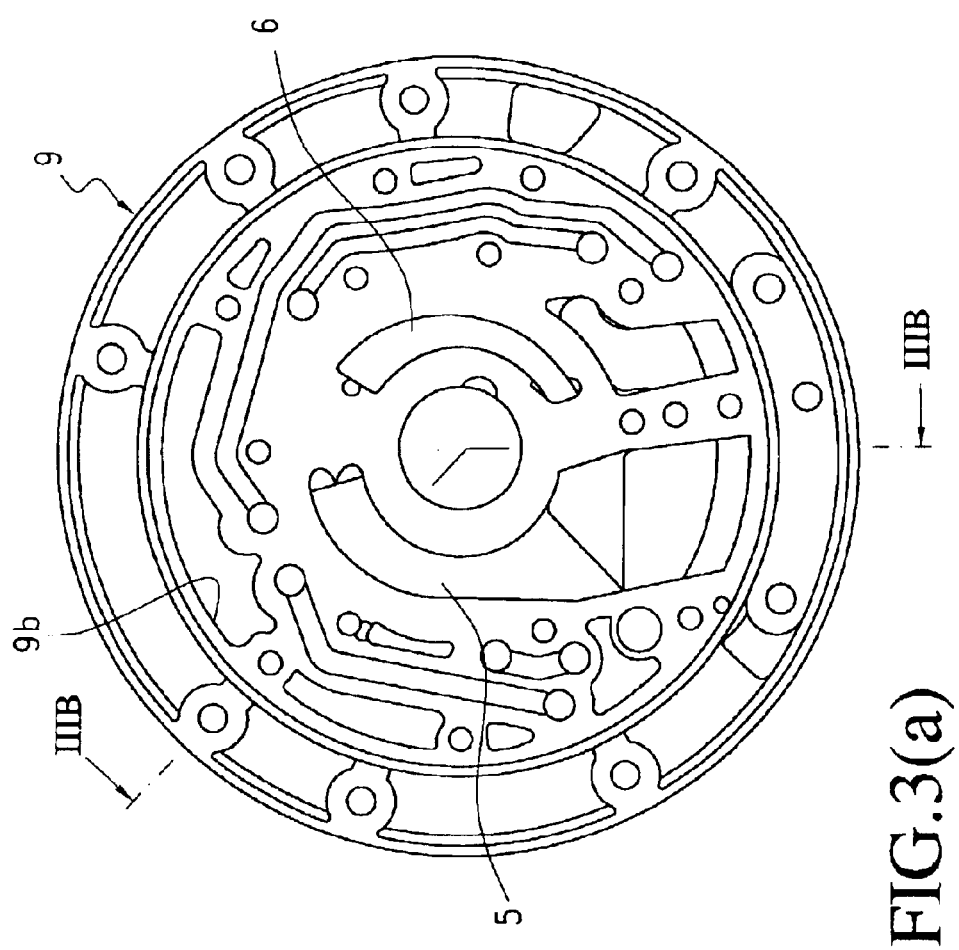
FIG. 3(a) is a front view of a pump cover (O/P cover) of the casing of the gear pump shown in FIGS. 1(a) and 1(b)

Further, as shown in FIGS. 3(a) and 3(b), the pump cover (O/P cover) 9 of the casing 10 is formed with a recess 9b for receiving the pump body (O/P body) 8. Intake port 5 is provided such that a portion thereof is disposed inside of the recess 9b and the delivery port 6 is provided such that a portion thereof is similarly disposed inside of the recess 9b. FIG. 3(b) also shows the rotating shaft 12 fitted to the pump cover (O/P cover) 9.

The gear chamber 11 is formed by fitting the pump body (O/P body) 8 to the recess 9b of the pump cover (O/P cover) 9. In this manner, the intake port 5 of the pump body (O/P body) 8 and the intake port 5 of the pump cover (O/P cover) 9 are axially aligned (opposed) and the delivery port 6 of the pump body (O/P body) 8 and the delivery port 6 of the pump cover (O/P cover) 9 are axially aligned (opposed). In the thus formed gear chamber 11 are arranged the pair of drive gears 3 and the driven gear 4 as shown in FIGS. 1(a) and 1(b).

Other features of the gear pump 1 of the embodiment of FIGS. 1(a) and 1(b) are the same as those of the conventional gear pump 1 shown in FIGS. 5(a) and 5(b).

The oil stored in the recesses (dimples) 14, 14, . . . and 17, 17, . . . flows (oozes) into the contact areas between (1) the side faces 3b and 3c of the drive gears 3 and the side faces 4b and 4c of the driven gear 4 and (2) the gear chamber side face 8a of the pump body 8 and the gear chamber side face 9a of the pump cover 9, due to centrifugal force generated by rotation of the drive gear 3 and the driven gear 4 and due to capillary action, to thereby form oil films therebetween.

Because the recesses (dimples) 14, 14, . . . arranged on the outer side circle 16 of the drive gear 3 and the recesses (dimples) 17, 17, . . . arranged at the driven gear 4 face the intake port 5 and the delivery port 6, by rotation of the drive gear 3 and the driven gear 4 oil is effectively stored at the recesses (dimples) 14, 14, . . . and 17, 17, . . . facing the ports 5 and 6, whereby oil films are formed between (1) the side faces 3b and 3c of the drive gears 3 and the side faces 4b and 4c of the driven gear 4 and (2) the gear chamber side face 8a of the pump body 8 and the gear chamber side face 9a of the pump cover 9. In this manner, wear of the respective sliding side faces 3b and 3c of the drive gear 3, the side faces 4b and 4c of the driven gear 4, the gear chamber side face 8a of the pump body 8 and the gear chamber side face 9a of the pump cover 9 can be reduced and change of the delivery rate of the gear pump 1 with age can be prevented. Further, sliding resistance between these contacting surfaces can be reduced and loss of torque can be reduced.

The recesses (dimples) 14, 44, . . . and 17, 17, . . . can be formed simultaneously with forming of the drive gear 3 and the driven gear 4 by using sintered molds and, therefore, working steps and cost of manufacture can be substantially equal to those of the conventional gear pump.

Further, by providing the recesses (dimples) 14, 14, . . . and 17, 17, . . . material of the drive gears 3 and the driven gear 4 can be saved and, therefore, a more light-weight drive gear 3 and driven gear 4 can be obtained and material cost can be saved.

Further, the recesses are provided in the pump gears of an otherwise conventional gear pump and, therefore, the conventional pump gear can be used and an entirely new pump gear is not necessary. Therefore, no substantial design change is needed and cost can be further reduced.

Further, when the gear pump 1 of the first embodiment is used as an oil pump of an automatic transmission in a vehicle, as shown by FIG. 1(a), since the torque loss can be reduced, drive force of the engine can be reduced by that amount, fuel cost can be reduced and a reduction in emissions can be achieved. Further, since the engine can be made small-sized because its drive force can be reduced, in addition to provision of light-weight drive gears 3 and driven gear 4, the drivetrain of the vehicle can be effectively made smaller and more compact.

Although in the above-described first embodiment, the recesses 14 and 17 are provided both in the pair of the drive gears 3 and in the driven gear 4 of the pump gear 2. Alternatively, the recesses can be provided in only the drive gears 3 or the driven gear 4. In this latter modification, the one of the drive gears 3 or the driven gear 4 provided with the recesses, corresponds to "one gear of a pair of gears" and other gear corresponds to "other gear", as this terminology is used in the claims.

Further, the recesses 14 and 17 may also be provided only at one side face 3b (or 3c), 4b (or 4c) of the drive gear 3 and the driven gear 4.

Further, the number and arrangement of the respective recesses 14 and 17 are not limited to those shown in FIGS. 1(a) and 1 (B). Instead, the number and arrangements of the recesses 14 and 17 can be arbitrarily chosen within a range which sufficiently ensures sealing between the sides faces 3b and 3c of the drive gear 3 and the side faces 4b and 4c of the driven gear 4 and the gear chamber side face 8a of the pump body 8 and the gear chamber side face 9 a of the pump cover 9, that is, within a range over which the pump delivery is not lowered. Further, it is preferable that the respective recesses 14 and 17 be such that the drive gear 3 and the driven gear 4 are dynamically balanced. Further, the number and the arrangement of the recesses 14 and 17 can be changed in shape and/or size with change in shape and/or size of the intake port 5 and the delivery port 6. shape and/or size of the intake port 5 and the delivery port 6.

Figure 4:
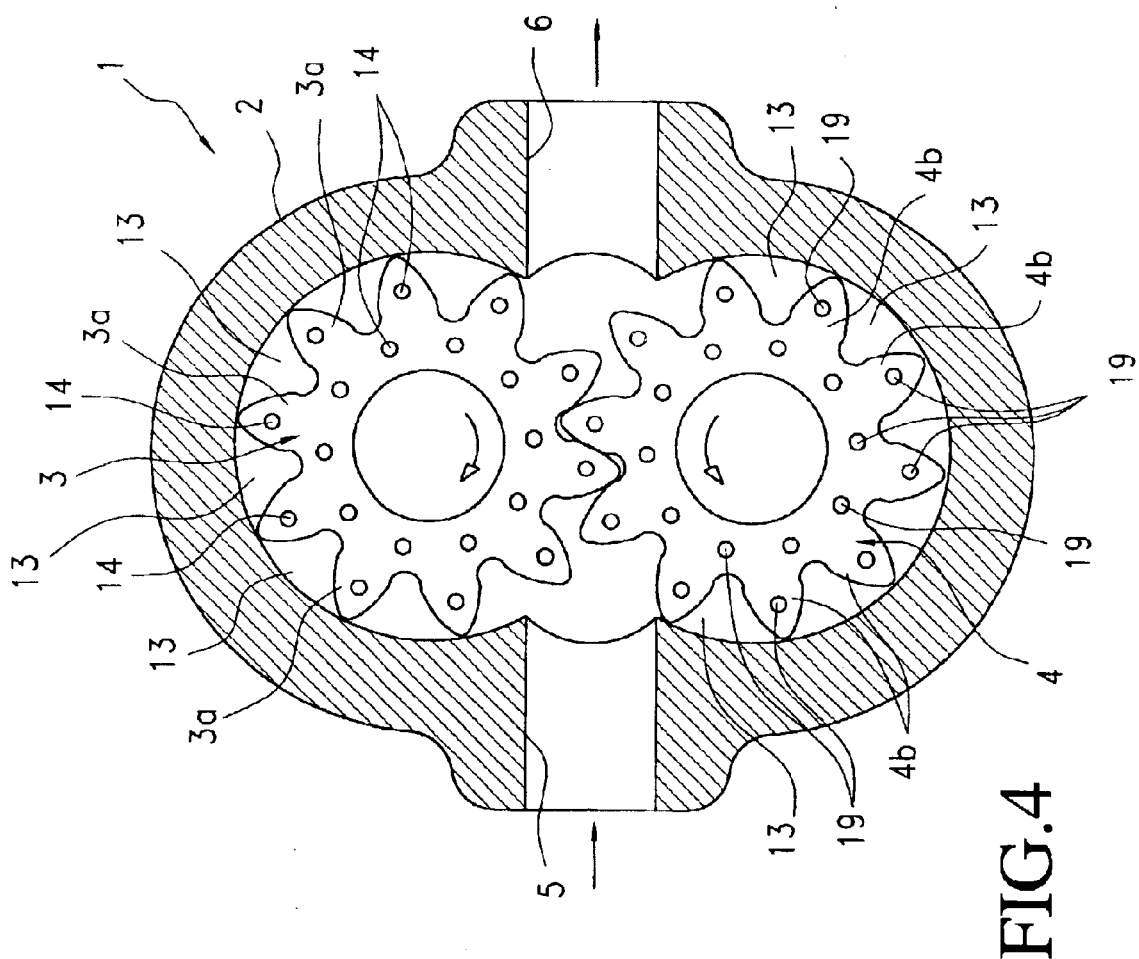
FIG. 4 is a sectional view schematically showing another embodiment of a gear pump according to the present invention.

Further, although in the above-described first embodiment the present invention is applied to an internal tooth gear pump wherein the pump gears 2 are the drive gears 3 having the outer teeth 3a and the driven gear 4 has the inner teeth 4a, the gear pump of the invention is not limited thereto but is also applicable to a so-called external tooth gear pump in which the pump gears 2 include the drive gears 3 having outer teeth 3a and the driven gear 4 having outer teeth 4b, as shown, for example, in FIG. 4. In the case of the external (outer) tooth gear pump, recesses 19 can be provided in the driven gear 4 having the outer teeth 4b, similar to the recesses 14 in the drive gear 3 of the above-described embodiment and can also be provided as in the above-described modified embodiment. Other features of the external tooth gear pump embodiment are the same as those of the above-described internal tooth gear pump and, further, the operation and effect of the external tooth gear pump are substantially the same as those of the above-described internal tooth gear pump.

Further, although the above-described embodiments have the recesses 14 and the recesses 17 formed in the drive gears 3 and/or the driven gear 4, alternatively the recesses 14 and 17 can be provided in the sliding contact side faces 8a and 9a of the gear chamber 11 of the casing 10 on which the drive gear 3 and the driven gear 4 slide. In yet another alternative the recesses can be provided both in the gears 3 and 4 and in the casing 10. That is, the recesses can be provided in at least any one of the 6 side faces 3b, 3c, 4b and 4c of the gears 3 and 4 and the gear chamber side faces 8a and 9a of the casing 10.

When the recesses are provided in the side faces 8a and 9a of the gear chamber 11 of the casing 10, as in the above-described embodiments, the recesses are sized and arranged such that the pump delivery is not lowered and the strengths of the pump case 8 and the pump cover 9 are not reduced. Further, in this case, similar to the arrangement of the recesses 14 provided in the drive gear 3 as described above, it is preferable to provide the recesses on the radially inward circle 15 and on the radially outward circle 16 as mentioned above, further, similar to the arrangement of the recesses 17 provided in the driven gear 4 as described above, it is preferable to provide the recesses on the circle 18 as mentioned above.

Further, although in the above-described embodiments, the recesses 14 and 17 are formed in the shape of a circular cylinder, the recesses can also be formed in other shapes. For example, the recesses can be formed in a shape of a multiangular prism prism, a quadrangular prism or the like, an elliptic cylinder having an elliptical cross-section or an oval cylinder having an oval cross-section. In the case of the elliptic cylinder and the oval cylinder, long axes may be made in line with a diameter, or the long axes can be aligned in a direction orthogonal to a diameter. Further, the recesses can be formed in a shape of a circular arc along the periphery (circumference). Further, the sectional area of the recesses arranged on the radially inward side (side proximate to the rotating shaft 12) can be made smaller than the sectional area of the recesses arranged on the radially outward side (side remote from the rotating shaft 12).

Further, although in the above-described embodiments, the recesses 14 and 17 each are formed in the shape of a circular cylinder having a constant sectional area, the sectional areas of the open ends of the recesses 14 and 17 can also be larger than other portions thereof. For example, the sectional areas of the open ends of the recesses 14 and 17 are set to be larger than those of other portions. Alternatively, the sectional areas of the open ends of the recesses 14 and 17 are set to be larger than those of the other portions by forming the recesses 14 and 17 such that the sectional areas are reduced from the openings toward the bottoms thereof, that is, by forming the recesses 14 and 17 each in a shape in which the sectional area is continuously reduced toward the bottom thereof, e.g., the shape of a circular cone, the shape of a pyramid, the shape of an elliptic cone, the shape of an oval cone, the shape of a truncated frustum of a circular cone, the shape of a truncated frustum of a prism, the shape of a truncated frustum of an elliptic cone or the shape of a truncated frustum of an oval cone. By setting the sectional areas of the opening ends of the recesses 14 and 17 larger than those of other portions, oil more easily enters into the recesses 14 and 17 and is securely stored therein. Further, when the drive gear 3 or the driven gear 4 is formed by sintering, the recesses may be simultaneously formed using a mold with shapes of the recesses.

Further, although according to the above-described embodiments, the recesses 14 and 17 are provided, recesses and projected portions may be formed in the side faces of the drive gear 3 and/or the driven gear 4 or in the gear chamber side faces 8a and 9a of the casing. That is, the recesses and projected portions can also serve as means for forming the oil film. In this case, forming the recesses in the side faces of the drive gears 3 and the driven gear 4 or the gear chamber side faces 8a and 9a of the casing can be dispensed with. The recesses and projections can be arranged such with the recesses and the projections repeated in the peripheral (circumferential) direction, for example, in a wavy shape and the recesses and the projections may be extended radially.

The disclosure of Japanese Patent Application No. 2001-320905 filed on Oct. 18, 2001, including the specification, drawings and abstract, is incorporated herein by reference in its entirety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A gear pump comprising:

a casing formed with an intake port, a gear chamber and a delivery port; and at least two gears rotatably mounted in the gear chamber and in mesh with each other, whereby rotation of said gears sucks oil in through the intake port and discharges oil from the delivery port and causes radially extending side faces of the two gears to slide on internal side faces of the gear chamber of the casing; and wherein one of said gears has a peripheral surface formed of teeth with grooves separating adjacent teeth, opposing and radially extending side faces and, in at least one of said opposing and radially extending side faces, first means for forming an oil film arranged radially inward of bottoms of said grooves and radially aligned with said bottoms of said grooves and second means for forming an oil film arranged radially outward of the bottoms of said grooves.

2. The gear pump according to claim 1 wherein said first and second means for forming an oil film are located in both of said opposing and radially extending side faces.

3. A gear pump comprising:

a casing formed with an intake port, a gear chamber and a delivery port;

at least two gears rotatably mounted in the gear chamber and in mesh with each other, whereby rotation of said gears sucks oil in through the intake port and discharges oil from the delivery port and causes radially extending side faces of the two gears to slide on internal side faces of the gear chamber of the casing; and wherein one of said gears has a peripheral surface formed of teeth with grooves separating adjacent teeth, and has opposing and radially extending side faces; and a first plurality of recesses arranged radially inward of bottoms of said grooves and radially aligned with said bottoms of said grooves and a second plurality of recesses arranged radially outward of the bottoms of said grooves, said first and second pluralities of recesses being formed together in at least one side face selected from the side faces of the said gears and the side faces of the gear chamber of the casing.

4. The gear pump according to claim 3:

wherein said one gear is a drive gear having outer teeth and the other of said gears is a driven gear mounted eccentric to the one gear and having inner teeth in mesh with the outer teeth.

5. The gear pump according to claim 4 wherein the first plurality of recesses are arranged on an inner circle concentric with the drive gear and the second plurality of recesses are arranged on an outer circle disposed radially outward of said bottoms of said grooves; and wherein a third plurality of recesses are formed in at least one side face selected from the side faces of the driven gear and the side faces of the gear chamber, are arranged on a circle having a diameter the same or substantially the same as a diameter of bottoms of grooves between adjacent inner teeth.

6. The gear pump according to claim 5:

wherein when the first plurality of recesses are each located at a circumferential center of one of the outer teeth; and wherein the recesses of the third plurality are each located at a circumferential center of one of the inner teeth.

7. An automatic transmission comprising:

the gear pump according to claim 3;

a planetary gear unit having a plurality of rotating elements;

a plurality of frictional engagement elements comprising a clutch and a brake for respectively engaging and releasing the plurality of rotating elements; and a hydraulic control unit for supplying a controlled hydraulic pressure produced by controlling hydraulic pressure supplied from the gear pump, at a predetermined magnitude, to the frictional engagement elements; and wherein rotation of a drive source is input to the automatic transmission and output at a changed speed by hydraulically controlling engagement and disengagement of the frictional engagement elements by the hydraulic control unit.

8. The gear pump according to claim 3 wherein the recesses of the first plurality of recesses are arranged on an inner circle concentric with the drive gear and the second plurality of recesses are arranged on an outer circle disposed radially outward of said bottoms of said grooves.

9. The gear pump according to claim 3 wherein said first and second pluralities of recesses are formed in both of said opposing and radially extending side faces.

* * * * *

UNITED STATES PATENT AND TRADEMARK OFFICE
CERTIFICATE OF CORRECTION

PATENT NO. : 6,824,486 B2  Page 1 of 1
DATED : November 30, 2004
INVENTOR(S) : Maeno et al.

It is certified that error appears in the above-identified patent and that said Letters Patent is hereby corrected as shown below:

<u>Title page,</u>
Item [75], Inventors, change "Kazutoshio" to -- Kazutoshi --.

Signed and Sealed this

Eighteenth Day of April, 2006

JON W. DUDAS
*Director of the United States Patent and Trademark Office*